(12) United States Patent
Wang et al.

(10) Patent No.: US 8,158,049 B2
(45) Date of Patent: Apr. 17, 2012

(54) METHOD OF FABRICATING SLAG FIBER FRICTION MATERIAL

(75) Inventors: To-Mai Wang, Zhonghe (TW); Ming-Der Ger, Daxi Township, Taoyuan County (TW); Kung-Hsu Hou, Daxi Township, Taoyuan County (TW); Kin-Seng Sun, Village Shenglin (TW); Wen-Cheng Lee, Bade (TW); Sheng-Fu Yang, Fongshan (TW); Chin-Ching Tzeng, Yonghe (TW)

(73) Assignee: Atomic Energy Council-Institute of Nuclear Energy Research, Lungtan, Taoyuan (TW)

( * ) Notice: Subject to any disclaimer, the term of this patent is extended or adjusted under 35 U.S.C. 154(b) by 30 days.

(21) Appl. No.: 12/644,276

(22) Filed: Dec. 22, 2009

(65) Prior Publication Data
US 2010/0320640 A1 Dec. 23, 2010

(30) Foreign Application Priority Data
Jun. 18, 2009 (TW) .................................. 098120393

(51) Int. Cl.
*B29C 43/02* (2006.01)

(52) U.S. Cl. .................................. 264/331.11; 264/332
(58) Field of Classification Search ............. 264/331.11, 264/332
See application file for complete search history.

(56) References Cited

U.S. PATENT DOCUMENTS

| | | | | | |
|---|---|---|---|---|---|
| 3,761,243 | A | * | 9/1973 | Kuntz et al. ...................... 65/19 |
| T941,012 | I4 | * | 12/1975 | Marzocchi ................. 428/299.4 |
| 4,352,764 | A | * | 10/1982 | Metz et al. ......................... 264/8 |
| 4,656,203 | A | * | 4/1987 | Parker ............................ 523/155 |
| 4,663,368 | A | * | 5/1987 | Harding et al. ............... 523/155 |
| 4,743,635 | A | * | 5/1988 | Nakagawa et al. ........... 523/155 |
| 5,495,922 | A | * | 3/1996 | Booher ...................... 188/251 A |
| 6,451,872 | B1 | * | 9/2002 | Yamane ........................ 523/156 |
| 7,294,188 | B2 | * | 11/2007 | Shao et al. ...................... 106/36 |
| 2002/0006981 | A1 | * | 1/2002 | Nakamura et al. ............ 523/155 |
| 2008/0302970 | A1 | * | 12/2008 | Fujieda et al. ............ 250/370.11 |

* cited by examiner

Primary Examiner — Joseph S. Del Sole
Assistant Examiner — Ryan Ochylski
(74) Attorney, Agent, or Firm — Jackson IPG PLLC; Demian K. Jackson

(57) ABSTRACT

Slag fiber is used to fabricate a friction material. Friction factor and abrasion loss of the friction material are controlled. The friction material can be used to make linings. Thus, slag fiber can be used as a replacement for natural material to make a friction material, and waste is thus recycled.

8 Claims, 3 Drawing Sheets

FIG.2

| | Composition ratio |
|---|---|
| 1 | slag compound fiber by adding graphite spread over the 40% into 300ml water than add 60% of phenolic resin mixed |
| 2 | slag compound fiber by adding graphite spread over the 50% into 300ml water than add 50% of phenolic resin mixed |
| 3 | slag compound fiber by adding graphite spread over the 60% into 300ml water than add 40% of phenolic resin mixed |
| 4 | slag compound fiber by adding glasses spread over the 40% into 300ml water than add 60% of phenolic resin mixed |
| 5 | slag compound fiber by adding glasses spread over the 50% into 300ml water than add 50% of phenolic resin mixed |
| 6 | slag compound fiber by adding glasses spread over the 60% into 300ml water than add 40% of phenolic resin mixed |

| | friction factor (μ) | abrasion loss (mg) |
|---|---|---|
| slag compound fiber by adding graphite of 40% Phenolic Resin60% | 0.31 | 1.91 |
| slag compound fiber by adding graphite of 50% Phenolic Resin50% | 0.43 | 2.83 |
| slag compound fiber by adding graphite of 60% Phenolic Resin40% | 0.36 | 0.36 |
| slag compound fiber by adding the glasses of 40% Phenolic Resin60% | 0.34 | 0.82 |
| slag compound fiber by adding the glasses of 50% Phenolic Resin50% | 0.22 | 0.41 |
| slag compound fiber by adding the glasses of 60% Phenolic Resin40% | 0.27 | 2.99 |

FIG.3

METHOD OF FABRICATING SLAG FIBER FRICTION MATERIAL

FIELD OF THE INVENTION

The present invention relates to fabricating a friction material; more particularly; relates to mixing a slag compound fiber with a phenolic resin to fabricate a slag fiber friction material with controlled friction factors and abrasion loss.

DESCRIPTION OF THE RELATED ARTS

A first prior art uses activated alumina, a fluorine polymer and a fibrous material to make a friction material, where the activated alumina and the fluorine polymer are the main components and the fibrous material is an accessory material. Although the abrasion amount is low on using the prior art, the main components are pure materials but not waste and so the cost is high.

A second prior art uses an ion polymer to be mix with a monomer (or comonomer) and divalent metal salts (or metallic oxides) in a water or non-water solution to obtain a friction material through polymerization or copolymerization with a staple of PVA or PAN and a friction conditioner (like carbon powder, graphite powder or molybdenum disulphide). The friction material can be made in one stage or two stages. Yet, the ion polymer takes a long time to be made; the additives are many; and the cost is high for the main components are not waste.

A third prior art uses calcium carbonate crystal beard, vermiculite, cashew nut oil and a hardening agent. Yet, the components are many and the cost is high for the main components are not waste.

A fourth prior art uses phenol resin binder, aluminum borate fiber, barium sulfate, a metal powder, graphite and a hardening agent. Yet, the components are many and the cost is high for the main components are not waste.

Accordingly, the above prior arts have high producing costs for not using waste; and the producing methods are complex which may consume more resources indirectly. Hence, the prior arts do not fulfill all users' requests on actual use.

SUMMARY OF THE INVENTION

The main purpose of the present invention is to mix a slag compound fiber with a phenolic resin to fabricate a slag fiber friction material with controlled friction factors and abrasion loss.

To achieve the above purpose, the present invention is a method of fabricating a slag fiber friction material, comprising steps of: (a) obtaining a slag compound fiber added with an additive; (b) mixing the slag compound fiber into water to be uniformly dispersed and added with a phenolic resin to obtain a first mixture; (c) pouring the first mixture into an agitating device to be agitated for obtaining a second mixture; and (d) pre-heating a device with a mold at 90 Celsius degrees (° C.) for 5 minutes (min) and pouring the second mixture into the mold to be pressed for a period between 15 min and 30 min under a temperature between 100° C. and 300° C. and a pressure between 2.5 mega-pascal (MPa) and 7.5 MPa to obtain a slag fiber friction material. Accordingly, a novel method of fabricating a slag fiber friction material is obtained.

BRIEF DESCRIPTIONS OF THE DRAWINGS

The present invention will be better understood from the following detailed description of the preferred embodiment according to the present invention, taken in conjunction with the accompanying drawings, in which FIG. 1 is the flow view showing the preferred embodiment according to the present invention;

FIG. 2 is the view showing the composition ratios; and

FIG. 3 is the view showing the abrasion loss.

DESCRIPTION OF THE PREFERRED EMBODIMENT

Figure 1:
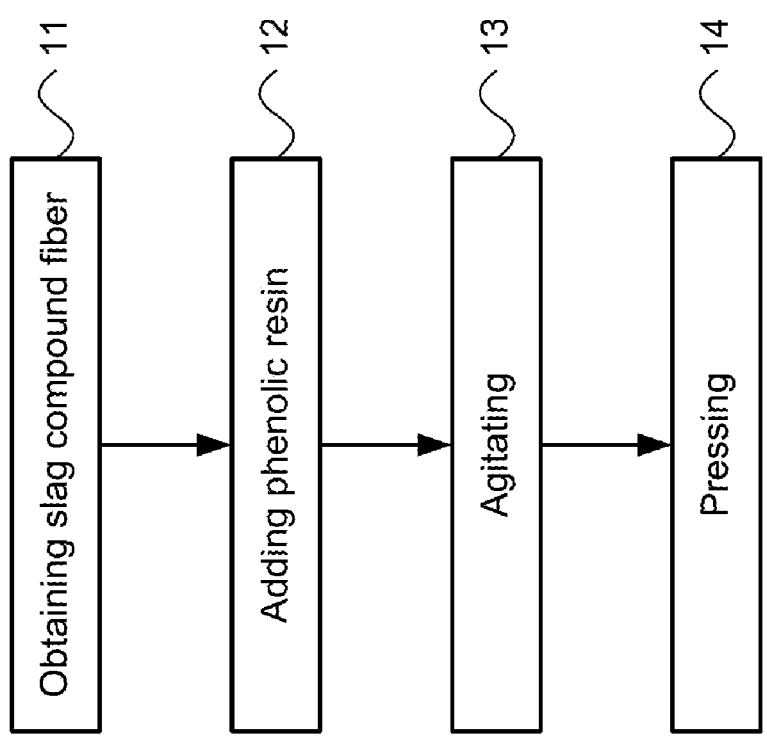

The following description of the preferred embodiment is provided to understand the features and the structures of the present invention.

Please refer to FIG. 1 and FIG. 2, which are a flow view showing a preferred embodiment according to the present invention; and a view showing composition ratios. As shown in the figures, the present invention is a method of fabricating a slag fiber friction material, comprising the following steps:

(a) Obtaining slag compound fiber 11: A slag compound fiber having an additive is obtained. The slag compound fiber is made of a water-quenched slag and the additive is graphite or glass, where graphite has a ratio between 3 percents (%) and 10%; or glass has a ratio between 10% and 30%.

(b) Adding phenolic resin 12: The slag compound fiber is mixed into 300 milli-liters (ml) of water to be uniformly dispersed; and, then, a phenolic resin is added to obtain a first mixture.

(c) Agitating 13: The first mixture is poured into a ball grinder or a star dispersing device to be agitated for obtaining a second mixture.

(d) Pressing 14: After agitating, a device having a mold is pre-heated at 90 Celsius degrees (° C.) for 5 minutes (min); and, then, the second mixture is poured into the mold to be pressed for a period between 15 min and 30 min under a temperature between 100° C. and 300° C. and a pressure between 2.5 mega-pascal (MPa) and 7.5 MPa. Thus, a slag fiber friction material is obtained.

Please refer to FIG. 3, which is a view showing abrasion loss. As shown in the figure, on using the present invention, a slag compound fiber having a composition ratio between 40 weight ratio (wt %) and 60 wt % is mixed into 300 ml water; and, then, a phenolic resin having a composition ratio between 40 wt % and 60 wt % is added. Under different composition ratios of the slag compound fiber and the phenolic resin, different abrasion loss for different friction factors are tested in a abrasion test device for 4 hours under a loading of 30N and a rotation velocity of 180 rpm with steel balls of SUJ2 having a hardness of HRC60±1.

As results show in FIG. 3, 40-60% of slag compound fibers with graphite additive have 0.31-0.43µ of friction factors and 0.36-2.83 mg of abrasion loss; and 40-60% of slag compound fibers with glass additive have 0.22-0.34µ of friction factors and 0.41-2.99 mg of abrasion loss, where 60% of slag compound fibers with graphite additive is preferred to obtain 0.36µ friction factor and 0.36 mg abrasion loss.

According to Code E (µ:0.25-0.35) and Code F (µ:0.35-0.45) for friction factor by Society of Automotive Engineers, the slag compound fiber fabricated according to the present invention can be used to make linings used in vehicles.

To sum up, the present invention is a method of fabricating a slag fiber friction material, where a slag compound fiber added with an additive is mixed with a phenolic resin to fabricate a slag fiber friction material with controlled friction factors and abrasion loss.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method of fabricating a slag fiber friction material, comprising steps of:
   (a) obtaining a slag compound fiber consisting of a water-quenched slag and an additive;
   (b) mixing said slag compound fiber into water to be uniformly dispersed, and adding a phenolic resin to obtain a first mixture;
   (c) pouring said first mixture into an agitating device to be agitated to obtain a second mixture; and
   (d) pre-heating a device having a mold at 90 Celsius degrees (° C.) for 5 minutes (min) and pouring said second mixture into said mold to be pressed for a period between 15 and 30 min under a temperature between 100° C. and 300° C. and a pressure between 2.5 megapascal (MPa) and 7.5 MPa to obtain a slag fiber friction material consisting of the slag compound fiber with the additive and phenolic resin.

2. The method according to claim 1, wherein, in step (a), said additive is graphite having a ratio between 3 percent (%) and 10% of a total 100 percent of the slag compound fiber having the additive.

3. The method according to claim 1, wherein, in step (a), said additive is glass having a ratio between 10% and 30% of a total 100 percent of the slag compound fiber having the additive.

4. The method according to claim 1, wherein, in step (a), said slag compound fiber is added at a ratio between 40% and 60% of a total 100 percent of the slag compound fiber having the additive and phenolic resin.

5. The method according to claim 1, wherein, in step (b), said slag compound fiber is mixed into 300 milli-liters (ml) of water.

6. The method according to claim 1, wherein, in step (b), said phenolic resin is added at a ratio between 40% and 60% of a total 100 percent of the slag compound fiber having the additive and phenolic resin.

7. The method according to claim 1, wherein, in step (c), said agitating device is a ball grinder.

8. The method according to claim 1, wherein 60% of said slag compound fibers with the additive comprising graphite of a total 100 percent of the slag compound fiber with the additive of graphite and phenolic resin is used to obtain $0.36\mu$ of friction factor and 0.36 mg of abrasion loss.

* * * * *